(12) United States Patent
Wang et al.

(10) Patent No.: US 12,294,523 B2
(45) Date of Patent: May 6, 2025

(54) APPLICATION INSTANCE DEPLOYMENT METHOD, APPLICATION INSTANCE SCHEDULING METHOD, AND APPARATUS

(71) Applicant: HUAWEI CLOUD COMPUTING TECHNOLOGIES CO., LTD., Guizhou (CN)

(72) Inventors: Nannan Wang, Shenzhen (CN); Yang Xu, Shenzhen (CN); Bo Yi, Shenzhen (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

(21) Appl. No.: 17/886,017

(22) Filed: Aug. 11, 2022

(65) Prior Publication Data

US 2022/0385586 A1 Dec. 1, 2022

Related U.S. Application Data

(63) Continuation of application No. PCT/CN2021/076193, filed on Feb. 9, 2021.

(30) Foreign Application Priority Data

Feb. 11, 2020 (CN) .......................... 202010086421.6

(51) Int. Cl.
*H04W 24/02* (2009.01)
*G06F 15/16* (2006.01)
(Continued)

(52) U.S. Cl.
CPC .......... *H04L 47/2416* (2013.01); *H04L 47/32* (2013.01); *H04L 65/40* (2013.01)

(58) Field of Classification Search
CPC ..... H04L 47/2416; H04L 47/32; H04L 65/40; H04L 41/044; H04L 41/12;
(Continued)

(56) References Cited

U.S. PATENT DOCUMENTS 6,976,087 B1 * 12/2005 Westfall .................. H04L 47/32
370/351
8,429,630 B2 * 4/2013 Nickolov ............ H04L 67/1021
717/148
(Continued)

FOREIGN PATENT DOCUMENTS

CN 101083517 A 12/2007
CN 101977242 A 2/2011
(Continued)

OTHER PUBLICATIONS

Extended European Search Report in European Appln No. 21753267.0, dated May 26, 2023, 13 pages.
(Continued)

*Primary Examiner* — Jason D Recek
*Assistant Examiner* — Golam Mahmud
(74) *Attorney, Agent, or Firm* — Fish & Richardson P.C.

(57) ABSTRACT

In an example application instance deployment method, a global management platform receives quality of service (QoS) requirement information from a first client. The QoS requirement information includes a first delay requirement, a second delay requirement, and a first quantity of connections. The second delay requirement is better than the first delay requirement, and the QoS requirement information is entered by a first user to the first client. The global management platform selects a first available site that meets the first delay requirement from managed sites. The global management platform deploys one or more first application instances on the first available site. A quantity of connections that can be established to the first application instance is less than the first quantity of connections.

18 Claims, 8 Drawing Sheets

(51) Int. Cl.
*H04L 12/26* (2006.01)
*H04L 12/28* (2006.01)
*H04L 47/2416* (2022.01)
*H04L 47/32* (2022.01)
*H04L 65/40* (2022.01)
*H04W 64/00* (2009.01)

(58) Field of Classification Search
CPC ..... H04L 41/5051; H04L 67/34; H04L 67/02; H04L 67/10; H04L 65/80; H04L 47/24; H04W 28/0268
See application file for complete search history.

(56) References Cited

U.S. PATENT DOCUMENTS

| | | | | |
|---|---|---|---|---|
| 9,003,141 | B2* | 4/2015 | Nielsen | G06F 11/20 718/1 |
| 9,325,585 | B1* | 4/2016 | Wang | H04L 41/5025 |
| 10,470,059 | B1 | 11/2019 | Annambhotla | |
| 10,715,463 | B1* | 7/2020 | Gelfond | H04L 67/10 |
| 2004/0114608 | A1* | 6/2004 | Rao | H04L 9/40 370/398 |
| 2008/0259794 | A1* | 10/2008 | Zou | H04L 41/5096 370/231 |
| 2009/0276771 | A1* | 11/2009 | Nickolov | G06Q 30/04 718/1 |
| 2012/0136697 | A1* | 5/2012 | Peles | H04L 43/04 705/7.38 |
| 2013/0329550 | A1* | 12/2013 | Kotecha | H04L 47/2475 370/230 |
| 2015/0195858 | A1* | 7/2015 | Jin | H04L 41/5051 370/230 |
| 2018/0288163 | A1* | 10/2018 | Mao | H04L 67/02 |
| 2019/0286486 | A1* | 9/2019 | Ma | G06F 9/5027 |
| 2019/0373443 | A1* | 12/2019 | Palaniappan | H04W 48/18 |
| 2020/0099742 | A1* | 3/2020 | Puente Pestaña | H04L 67/52 |
| 2020/0106858 | A1* | 4/2020 | Huang | H04L 67/63 |
| 2020/0120665 | A1* | 4/2020 | Jin | H04L 45/74 |
| 2020/0296606 | A1* | 9/2020 | Mendoza | H04L 41/12 |
| 2020/0374741 | A1* | 11/2020 | Li | H04W 72/535 |
| 2021/0286638 | A1* | 9/2021 | Fan | H04L 43/0852 |

FOREIGN PATENT DOCUMENTS

| | | |
|---|---|---|
| CN | 109831490 A | 5/2019 |
| CN | 110365787 A | 10/2019 |
| WO | 2018219229 A1 | 12/2018 |

OTHER PUBLICATIONS

International Search Report and Written Opinion in International Appln. No. PCT/CN2021/076193, mailed on May 11, 2021, 15 pages (with English translation).

* cited by examiner

APPLICATION INSTANCE DEPLOYMENT METHOD, APPLICATION INSTANCE SCHEDULING METHOD, AND APPARATUS

CROSS-REFERENCE TO RELATED APPLICATIONS

This application is a continuation of International Application No. PCT/CN2021/076193, filed on Feb. 9, 2021, which claims priority to Chinese Patent Application No. 202010086421.6, filed on Feb. 11, 2020, the disclosure of which is hereby incorporated by reference in its entirety.

TECHNICAL FIELD

This application relates to the field of edge computing, and in particular, to an application instance deployment method, an application instance scheduling method, and an apparatus.

BACKGROUND

Currently, in a process of deploying an edge application instance, a user first specifies a resource, a region, and a location according to a coverage requirement of the user. Then, a global management platform obtains an available edge site through filtering at the location specified by the user, and deploys an application instance. Subsequently, the user can view a region and a geographical location of the application instance. However, creating an edge application instance based on a region and a location specified by the user is only a compromise selection currently under a capability of the global management platform, and cannot truly provide an edge cloud service with a low delay and high traffic.

SUMMARY

This application provides an application instance deployment method and an application instance scheduling method, so as to provide a user with an edge cloud service of high quality of service.

According to a first aspect, an application instance deployment method is provided. The method includes: A global management platform receives quality of service (QoS) requirement information from a first client. The QoS requirement information includes a first delay requirement, a second delay requirement, and a first quantity of connections, the second delay requirement is better than the first delay requirement, and the QoS requirement information is entered by a first user to the first client. The global management platform selects a first available site that meets the first delay requirement from managed sites. The global management platform deploys one or more first application instances on the first available site. A quantity of connections that can be established to the first application instance is less than or equal to the first quantity of connections.

According to the foregoing technical solution, the global management platform selects, based on the first delay requirement entered by the first user to the first client, to deploy an application instance on a site that meets the first delay requirement. Therefore, an application instance deployed by the global management platform may provide a customer of the first user with an edge cloud service of high quality of service.

With reference to the first aspect, in some implementations of the first aspect, that the global management platform selects a first available site that meets the first delay requirement from managed sites includes: The global management platform selects, based on a first global QoS information table, the first available site that meets the first delay requirement from the managed sites. The first global QoS information table includes QoS information of the sites managed by the global management platform.

With reference to the first aspect, in some implementations of the first aspect, the method further includes: The global management platform selects a second application instance that does not meet the second delay requirement from the one or more first application instances; the global management platform selects a second available site that meets the second delay requirement from the managed sites; and the global management platform deploys the second application instance on the second available site.

According to the foregoing technical solution, the global management platform updates, through optimization according to the second delay requirement, a deployment location of an application instance that does not meet the second delay requirement, so that an optimized application instance can provide the customer of the first user with an edge cloud service of higher quality.

With reference to the first aspect, in some implementations of the first aspect, the method further includes: The global management platform sets a resource reservation threshold based on a quantity of connections that can be established to a third application instance deployed on a managed first site; and when a remaining quantity of connections to the first site is less than the resource reservation threshold, the global management platform deploys a fourth application instance on the first site. QoS information of the fourth application instance is the same as or equal to QoS information of the third application instance.

With reference to the first aspect, in some implementations of the first aspect, the method further includes: The global management platform predicts an increase of a quantity of connections to a first network segment based on historical access data. The first network segment is a network segment carried by the third application instance. The global management platform computes a quantity of fourth application instances based on the increase of the quantity of connections to the first network segment.

With reference to the first aspect, in some implementations of the first aspect, the method further includes: The global management platform receives a first request message from a second client or a regional management platform. The first request message is used to request to schedule an application instance for the second client, and the first request message includes identification information of the second client. The global management platform obtains an available application instance from the one or more first application instances through filtering based on the first request message and a second global QoS information table. The second global QoS information table includes QoS information of the first application instance.

With reference to the first aspect, in some implementations of the first aspect, the first request message further includes a third delay requirement entered by a second user to the second client.

With reference to the first aspect, in some implementations of the first aspect, the method further includes: The global management platform schedules an application instance for the second user based on a QoS level of the second user.

According to a second aspect, an application instance deployment method is provided. The method includes: A first client receives, through a first interface, QoS requirement information entered by a first user. The QoS requirement information includes a first delay requirement, a second delay requirement, and a first quantity of connections, and the second delay requirement is better than the first delay requirement. The first client sends the QoS requirement information to a global management platform.

According to the foregoing technical solution, the global management platform selects, based on the first delay requirement entered by the first user to the first client, to deploy an application instance on a site that meets the first delay requirement. Therefore, an application instance deployed by the global management platform may provide a customer of the first user with an edge cloud service of high quality of service.

With reference to the second aspect, in some implementations of the second aspect, the first interface includes an application programming interface.

According to a third aspect, an application instance scheduling method is provided. The method includes: A regional management platform receives a second request message from a second client. The second request message is used to request to schedule an application instance for the second client, and the second request message includes identification information of the second client. The regional management platform obtains an available application instance from one or more fifth application instances through filtering based on the second request message and a business QoS information table. The fifth application instance is an application instance deployed by a global management platform based on QoS requirement information from a first client on a site managed by the regional management platform, and the business QoS information table includes QoS information of the fifth application instance.

According to the foregoing technical solution, an application instance scheduled by the regional management platform for the second client based on a request message from the second client and the business QoS information table may provide a user with an edge cloud service of high quality.

With reference to the third aspect, in some implementations of the third aspect, the second request message further includes a third delay requirement entered by a second user to the second client.

With reference to the third aspect, in some implementations of the third aspect, the method further includes: The regional management platform schedules an application instance for the second user based on a QoS level of the second user.

With reference to the third aspect, in some implementations of the third aspect, the method further includes: The regional management platform sends a first request message to the global management platform based on the second request message. The first request message is used to request to schedule an application instance for the second client.

According to the foregoing technical solution, when the regional management platform cannot schedule an available application instance for the second client, the regional management platform may request the global management platform to schedule an application instance for the second client.

According to a fourth aspect, a global management platform is provided, and includes a transceiver unit and a processing unit. The transceiver unit is configured to receive QoS requirement information from a first client. The QoS requirement information includes a first delay requirement, a second delay requirement, and a first quantity of connections, the second delay requirement is better than the first delay requirement, and the QoS requirement information is entered by a first user to the first client. The processing unit is configured to select a first available site that meets the first delay requirement from managed sites. The processing unit is further configured to deploy one or more first application instances on the first available site. A quantity of connections that can be established to the first application instance is less than or equal to the first quantity of connections.

With reference to the fourth aspect, in some implementations of the fourth aspect, the processing unit is specifically configured to select, based on a first global QoS information table, the first available site that meets the first delay requirement from the managed sites. The first global QoS information table includes QoS information of the sites managed by the global management platform.

With reference to the fourth aspect, in some implementations of the fourth aspect, the processing unit is further configured to select a second application instance that does not meet the second delay requirement from the one or more first application instances; the processing unit is further configured to select a second available site that meets the second delay requirement from the managed sites; and the processing unit is further configured to deploy the second application instance on the second available site.

With reference to the fourth aspect, in some implementations of the fourth aspect, the processing unit is further configured to set a resource reservation threshold based on a quantity of connections that can be established to a third application instance deployed on a managed first site; and when a remaining quantity of connections to the first site is less than the resource reservation threshold, the processing unit is further configured to deploy a fourth application instance on the first site. QoS information of the fourth application instance is the same as or equal to QoS information of the third application instance.

With reference to the fourth aspect, in some implementations of the fourth aspect, the processing unit is further configured to predict an increase of a quantity of connections to a first network segment based on historical access data. The first network segment is a network segment carried by the third application instance. The processing unit is further configured to compute a quantity of fourth application instances based on the increase of the quantity of connections to the first network segment.

With reference to the fourth aspect, in some implementations of the fourth aspect, the transceiver unit is further configured to receive a first request message from a second client or a regional management platform. The first request message is used to request to schedule an application instance for the second client, and the first request message includes identification information of the second client. The processing unit is further configured to obtain an available application instance from the one or more first application instances through filtering based on the second request message and a second global QoS information table. The second global QoS information table includes QoS information of the first application instance.

With reference to the fourth aspect, in some implementations of the fourth aspect, the first request message further includes a third delay requirement entered by a second user to the second client.

With reference to the fourth aspect, in some implementations of the fourth aspect, the processing unit is further configured to schedule an application instance for the second user based on a QoS level of the second user.

According to a fifth aspect, a client is provided, and includes a receiving unit and a sending unit. The receiving unit is configured to receive, through a first interface, QoS requirement information entered by a first user. The QoS requirement information includes a first delay requirement, a second delay requirement, and a first quantity of connections, and the second delay requirement is better than the first delay requirement. The transceiver unit is configured to send the QoS requirement information to a global management platform.

With reference to the fifth aspect, in some implementations of the fifth aspect, the first interface includes an application programming interface.

According to a sixth aspect, a regional management platform is provided, and includes a transceiver unit and a processing unit. The transceiver unit is configured to receive a second request message from a second client. The second request message is used to request to schedule an application instance for the second client, and the second request message includes identification information of the second client. The processing unit is configured to obtain an available application instance from one or more fifth application instances through filtering based on the second request message and a business QoS information table. The fifth application instance is an application instance deployed by a global management platform based on QoS requirement information from a first client on a site managed by the regional management platform, and the business QoS information table includes QoS information of the fifth application instance.

With reference to the sixth aspect, in some implementations of the sixth aspect, the second request message further includes a third delay requirement entered by a second user to the second client.

With reference to the sixth aspect, in some implementations of the sixth aspect, the processing unit is further configured to schedule an application instance for the second user based on a QoS level of the second user.

With reference to the sixth aspect, in some implementations of the sixth aspect, the transceiver unit is further configured to send a first request message to the global management platform based on the second request message. The first request message is used to request to schedule an application instance for the second client.

According to a seventh aspect, a global management platform is provided, and includes a processor. The processor is coupled to a memory, and may be configured to execute instructions in the memory, to implement the method according to any one of the first aspect and the possible implementations of the first aspect.

According to an eighth aspect, a client is provided, and includes a processor. The processor is coupled to a memory, and may be configured to execute instructions in the memory, to implement the method according to any one of the second aspect and the possible implementations of the second aspect.

According to a ninth aspect, a regional management platform is provided, and includes a processor. The processor is coupled to a memory, and may be configured to execute instructions in the memory, to implement the method according to any one of the third aspect and the possible implementations of the third aspect.

According to a tenth aspect, a processor is provided, including an input circuit, an output circuit, and a processing circuit. The processing circuit is configured to receive a signal by using the input circuit, and transmit a signal by using the output circuit, so that the processor performs the method according to any one of the first aspect to the third aspect and the possible implementations of the first aspect to the third aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eleventh aspect, a processing apparatus is provided, including a processor and a memory. The processor is configured to: read an instruction stored in the memory, receive a signal via a receiver, transmit a signal via a transmitter, and perform the method according to any one of the first aspect to the third aspect and the possible implementations of the first aspect to the third aspect.

Optionally, there are one or more processors, and there are one or more memories.

Optionally, the memory may be integrated with the processor, or the memory and the processor may be separately disposed.

During specific implementation, the memory may be a non-transitory memory, for example, a read-only memory (ROM). The memory and the processor may be integrated into one chip, or may be disposed in different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may come from a receiver. The transmitter and the receiver may be collectively referred to as a transceiver.

The processing apparatus according to the eleventh aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (which may also be referred to as code or an instruction). When the computer program is run, a computer is enabled to perform the method according to any one of the first aspect to the third aspect and the possible implementations of the first aspect to the third aspect.

According to a thirteenth aspect, a computer-readable medium is provided. The computer-readable medium stores a computer program (which may also be referred to as code or an instruction). When the computer program is run on a computer, the computer is enabled to perform the method according to any one of the first aspect to the third aspect and the possible implementations of the first aspect to the third aspect.

According to a fourteenth aspect, an edge cloud scheduling system is provided, and includes the foregoing global management platform, the foregoing first client, and the foregoing regional management platform.

DETAILED DESCRIPTION OF EMBODIMENTS

Figure 1:
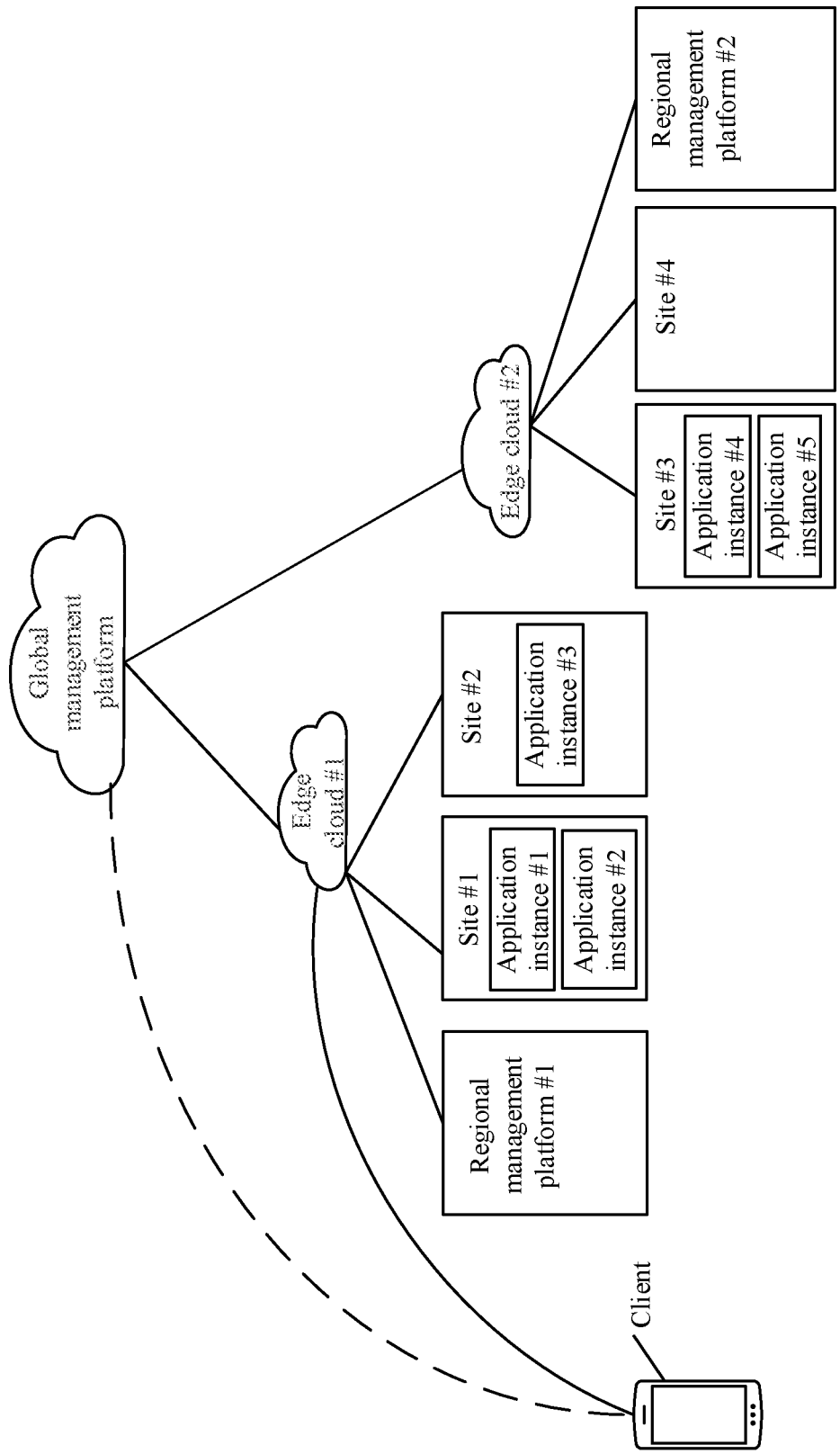
FIG. 1 is a schematic diagram of an application scenario according to an embodiment of this application.

Edge cloud computing, referred to as an edge cloud, is a cloud computing platform built on the edge infrastructure based on a core of a cloud computing technology and an edge computing capability and is an elastic cloud platform formed based on comprehensive capabilities such as computing, network, storage, and security at an edge location, and forms an end-to-end technical architecture with a central cloud and an internet of things terminal. Network forwarding, storage, computing, intelligent data analysis, and the like are processed at an edge, to reduce a response delay, reduce cloud pressure, reduce bandwidth costs, and provide cloud services such as network-wide scheduling and power distribution.

The edge cloud is a type of a public cloud. Based on a widely covered small site, the edge cloud is generally a content delivery network (content delivery network, CDN), a point of presence (point of presence, POP), and mobile edge computing (mobile edge computing, MEC). Each node provides a public cloud service in a small cluster form. The edge cloud has features of a low delay, generally a delay of 5 ms in an area, and a high bandwidth (40 Gb to 600 Gb+) feature. A quantity reaches more than one thousand, or even tens of thousands. Generally, cloud computing is also referred to as fog computing, edge computing, the edge cloud, cloudlet (cloudlet), or the like in the industry.

In addition, "region (region)" and "available zone (available zone, AZ)" are concepts related to cloud computing. The region is a region in which a data center is located, and may be a region (South China) or a city (Shenzhen or Dongguan). The available zone is a physical zone in which an equipment room or a site is located, and has features of energy consumption and network independence. One region generally includes one or more availability zones that are interconnected with a low delay, and is used in a scenario such as disaster recovery backup and load balancing and a service in a same region. Most cloud computing services do not support cross-region services.

An edge cloud user pursues ultimate experience, in other words, the edge cloud user actually requires delay and traffic guarantees. Currently, in a process of creating an edge application instance, the user first specifies a resource, a region, and a location according to a coverage requirement of the user, and then a global management platform obtains an available site through filtering at the location specified by the user, and deploys an application instance. Subsequently, the user can view a region and a geographical location of the application instance. However, creating an edge application instance based on a region and a location specified by the user is only a compromise selection currently under a capability of the global management platform, and cannot truly provide an edge cloud service with a low delay and high traffic. The application instance may be a virtual machine, a container, or a software module.

Therefore, the embodiments of this application provide an application instance deployment method and an application instance scheduling method, so as to provide a user with an edge cloud service with a low delay and high traffic.

It should be noted that, in the embodiments of this application, a first user is a user who uses a client #1, and a second user is a user who uses a client #2. A first application instance is an initially deployed application instance, a second application instance is an application instance that does not meet a second delay requirement in the first application instances, a third application instance is a finally deployed application instance, and a fourth application instance is an application instance that is newly added when the third application instances are insufficient.

FIG. 1 is a schematic diagram of an application scenario of a method according to an embodiment of this application. As shown in FIG. 1, the application scenario of this application may be in the edge computing field.

A global management platform manages all sites in a plurality of edge clouds. For example, in FIG. 1, the global management platform manages sites in an edge cloud #1 and sites in an edge cloud #2.

An edge cloud may include edge clusters, and may include a plurality of processing devices. Each processing device in the edge cloud may be connected to another client that is not in the edge cloud; and may collect information by using the another client, transmit the information to a regional management platform in the edge cloud, and then transmit the information to the global management platform or process the information on the regional management platform. For example, in FIG. 1, the edge cloud #1 includes a site #1, a site #2, and a regional management platform #1, and the regional management platform #1 may manage the site #1 and the site #2; and the edge cloud #2 includes a site #3, a site #4, and a regional management platform #2, and the regional management platform #2 may manage the site #3 and the site #4.

A physical form of a site may be a single processing device, and the global management platform may deploy an application instance on the site.

An application instance is a specific application deployed by a same application service on different sites, in other words, one application service may correspond to a plurality of application instances. As shown in FIG. 1, a plurality of application instances (an application instance #1 to an application instance #5) corresponding to a same application service may be deployed on a same site or different sites. For example, the application instance #1 and the application instance #2 are deployed on the site #1, the application instance #3 is deployed on the site #2, and the application instance #4 and the application instance #5 are deployed on the site #3.

It should be understood that a client connected to a processing device may be an access terminal, a subscriber unit, a subscriber station, a mobile station, a mobile console, a remote station, a remote terminal, a mobile device, a user terminal, a terminal, a wireless communications device, a user agent, or a user apparatus. A physical form of A site may alternatively be a cellular phone, a cordless telephone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, or the like. This is not specifically limited in this embodiment of this application.

Figure 2:
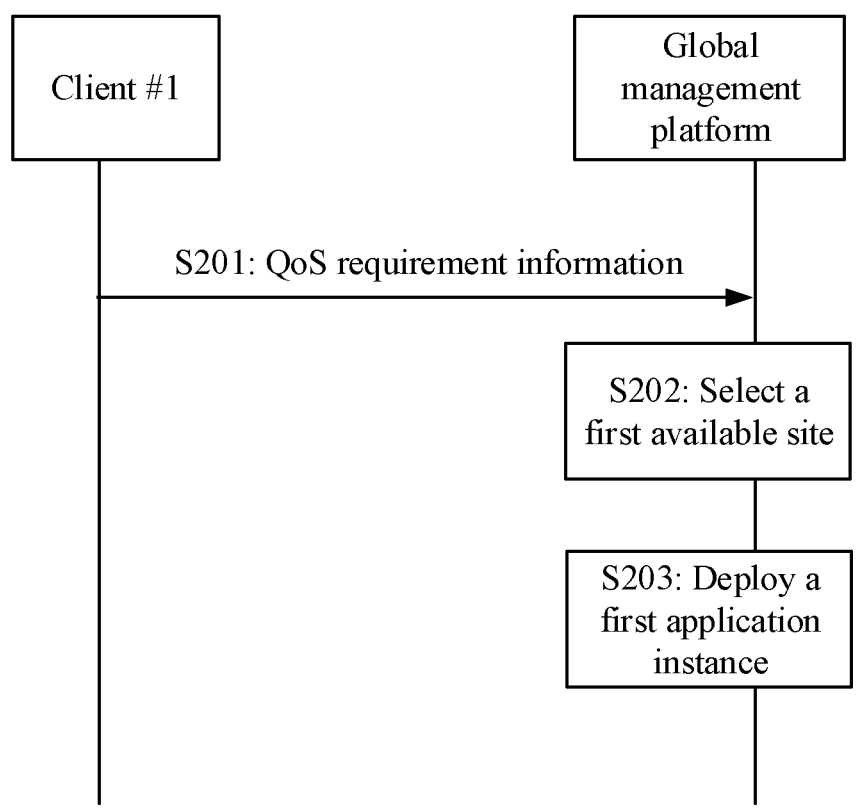
FIG. 2 to FIG. 4 are schematic flowcharts of an application instance deployment method according to an embodiment of this application.

FIG. 2 shows an application instance deployment method according to an embodiment of this application. The method 200 shows a process of interaction between a global management platform and a client. The global management platform and the client may respectively be, for example, the global management platform and the client in FIG. 1. As shown in FIG. 2, the method 200 includes S201 to S203. Each step is described in detail below.

S201: A client #1 (for example, a first client) sends QoS requirement information to the global management platform. Accordingly, the global management platform receives the QoS requirement information from the client #1.

The QoS requirement information includes a first delay requirement, a second delay requirement, and a first quantity of connections, and the second delay requirement is better than the first delay requirement. The QoS requirement information is entered by a first user to the client #1. For example, the first delay requirement may be a maximum delay that can be accepted by a user; the second delay requirement may be a delay that is expected by the user; and the first quantity of connections may be a maximum quantity of connections that can be established to an application instance.

The first user may enter the QoS requirement information through an application programming interface (application programming interface, API).

An edge cloud service is used as an example. An existing edge cloud service API interface does not have a setting related to business QoS requirement information. Therefore, in this embodiment of this application, detailed descriptions related to the business QoS requirement information is added to the existing edge cloud service API interface, to form an edge cloud service API interface that is based on business QoS requirement information. An example of the edge cloud service API interface provided in this embodiment of this application is as follows:

```
"coverage": {
"coverageLevel": "region",
"coveragePolicy": "discrete",
"coverageSites": [{
"site": "Xibei, Huabei",
"demand": ["CMCC:10"]}],
"domainname": www.myservice.com
"QoS": {
  "Delay": {
    "max": "30 ms",
    "expection": "5 ms"},
```

-continued

```
"Access capability": {
  "maxlinksPerInstance": 2000
  "maxlinksNum": 3W
  "maxlinksNum": 1000W
}},
```

As described above, in the edge cloud service API interface provided in this embodiment of this application, a manner of assigning a value to the parameter "demand" in a region description is removed, in other words, a description of an instance quantity is removed. According to the method in this embodiment of this application, the instance quantity may be determined based on a parameter in an access capability. For example, computing may be performed according to Formula (1):

$$\text{InstanceNum} = (\text{minlinksNum}/\text{maxlinksPerInstance}) * 120\% \quad \text{Formula (1)}$$

In this embodiment of this application, the parameter "QoS" is added to a resource description in the existing solution, to add a description of the QoS requirement information. The parameter "Delay" is a user-defined data structure, and represents a description of delay QoS. The parameter "Access capability" is also a user-defined data structure, and represents a description of access number QoS. The "Delay" structure includes two parameters: The parameter "max" indicates a maximum delay, and the parameter "expection" indicates an expected delay. The "Access capability" structure includes three parameters: The parameter "maxlinksPerinstance" represents a maximum quantity of connections to each application instance, the parameter "maxlinksNum" represents a maximum quantity of connections to each site, and the parameter "minlinksNum" represents a minimum quantity of connections to each site.

It should be understood that, in the API interface shown above, only an example in which a delay and a maximum quantity of connections to each application instance are added is used for description. However, this is not limited in this embodiment of this application. In the API interface provided in this embodiment of this application, descriptions of parameters such as a transmission bandwidth and a data packet loss rate may be further added.

It may be understood that the first user may enter related configuration parameters of the first delay requirement, the second delay requirement, and the first quantity of connections to the client #1 through the edge service API interface described above. The foregoing parameter value assignment is merely an example, and should not be limited in this embodiment of this application. It should be understood that the first user may assign a value to the foregoing parameter according to a requirement of the first user.

Optionally, the client #1 may further obtain the QoS requirement information through prediction based on delay requirement information historically entered by the first user, and then send the QoS requirement information to the global management platform.

S202: The global management platform selects a first available site that meets the first delay requirement from managed sites.

Optionally, the global management platform selects the first available site that meets the first delay requirement from all or some of the managed sites.

The global management platform may obtain, through filtering based on locally stored site QoS information, the first available site that meets the first delay requirement information.

Optionally, the global management platform may establish a first global QoS information table. The first global QoS information table includes QoS information of the sites. Then, the global management platform obtains, through filtering based on the first global QoS information table, the first available site that meets first QoS requirement information.

A method in which the global management platform establishes the first global QoS information table may be as follows:

The global management platform establishes the first global QoS information table based on the managed sites and a network segment of a specified operator.

The specified operator may be, for example, China Mobile, China Telecom, China Unicom, or another operator. This is not limited in this embodiment of this application. It may be understood that different operators correspond to different network segments, and different regions correspond to different network segments. Therefore, when an operator and a region are specified, a corresponding network segment is also fixed.

Table 1 provides an example of the first QoS information table.

TABLE 1

| Site identifier | Network segment | Delay | Region |
|---|---|---|---|
| Site # 1 | 10.1.1.1-10.2.2.2 | 5 ms | Longitude-Latitude |
| Site # 1 | 10.3.3.3-10.4.4.4 | 15 ms | Longitude-Latitude |
| Site # 1 | 10.6.6.6-10.7.7.7 | 25 ms | Longitude-Latitude |
| Site # 2 | 10.1.1.1-10.2.2.2 | 25 ms | Longitude-Latitude |
| Site # 2 | 10.3.3.3-10.4.4.4 | 15 ms | Longitude-Latitude |
| Site # 2 | 10.6.6.6-10.7.7.7 | 5 ms | Longitude-Latitude |
| Site # 3 | 10.1.1.1-10.2.2.2 | 25 ms | Longitude-Latitude |
| Site # 3 | 10.3.3.3-10.4.4.4 | 5 ms | Longitude-Latitude |
| Site # 3 | 10.6.6.6-10.7.7.7 | 25 ms | Longitude-Latitude |
| Site # 4 | 10.1.1.1-10.2.2.2 | 25 ms | Longitude-Latitude |
| Site # 4 | 10.3.3.3-10.4.4.4 | 25 ms | Longitude-Latitude |
| Site # 4 | 10.6.6.6-10.7.7.7 | 25 ms | Longitude-Latitude |

As shown in Table 1, an example in which the global management platform manages the site #1 to the site #4 and an example in which corresponding network segments are 10.1.1.1-10.2.2.2, 10.3.3.3-10.4.4.4, and 10.6.6.6-10.7.7.7 after an operator and a region are specified are used to describe content of the first QoS information table.

The site identifier is used to identify a site, and the site identifier may be a different number allocated by the global management platform to each site.

A correspondence between a site, a network segment, and a delay is a communication delay of accessing the site by a client whose internet protocol (internet protocol, IP) address belongs to the network segment. As shown in Table 1, a communication delay of accessing the site #1 by a client whose IP address belongs to 10.1.1.1-10.2.2.2 is 5 ms; a communication delay of accessing the site #1 by a client whose IP address belongs to 10.3.3.3-10.4.4.4 is 15 ms, and a communication delay of accessing the site #1 by a client whose IP address belongs to 10.6.6.6-10.7.7.7 is 25 ms. Similarly, Table 1 further shows communication delays of respectively accessing the site #2 to the site #4 by clients whose IP addresses belong to different network segments.

A correspondence between a site and a region is as follows: The site is disposed in the region. As shown in Table 1, the edge #1 to the site #4 are disposed in a same area.

An example in which the first delay requirement information is that a maximum communication delay is 20 ms is used. The global management platform may learn, according to Table 1, that a communication delay of accessing the edge point #4 by each client is 25 ms. In this case, the site #4 is unavailable. Therefore, the global management platform may determine the site #1 to the site #3 as first available sites.

S203: The global management platform deploys one or more first application instances on the first available site.

A quantity of connections that can be established to the one or more first application instances is less than or equal to the first quantity of connections.

An example in which the instance quantity computed according to Formula (1) is equal to 5 is used. The global management platform may randomly deploy the application instance #1 to the application instance #5 on the site #1 to the site #3.

For example, as shown in FIG. 1, the global management platform randomly selects the site #1 to the site #4 in a region specified by the first user, randomly deploys the application instance #1 and the application instance #2 on the site #1, deploys the application instance #3 on the site #2, and separately deploys the application instance #4 and the application instance #5 on the site #3.

Then, the global management platform allocates a network segment for which each application instance is responsible, and computes a communication delay of accessing each application instance by a client.

For example, the application instance #1 is responsible for 10.1.1.1-10.2.2.2, the application instance #2 is responsible for 10.3.3.3-10.4.4.4, the application instance #3 is responsible for 10.6.6.6-10.7.7.7, the application instance #4 is responsible for 10.1.1.1-10.2.2.2, and the application instance #5 is responsible for 10.3.3.3-10.4.4.4.

The communication delay of accessing the application instance by the client may also be understood as a communication delay used by the client to access a site in which the application instance is located. It may be learned from Table 1 that the communication delay of accessing the site #1 by the client whose IP address belongs to 10.1.1.1-10.2.2.2 is 5 ms. Therefore, it may be learned that a communication delay of accessing the application instance #1 by the client whose IP address belongs to 10.1.1.1-10.2.2.2 is also 5 ms. Similarly, it may be learned from Table 1 that a communication delay of accessing the application instance #2 by the client whose IP address belongs to 10.3.3.3-10.4.4.4 is 15 ms; a communication delay of accessing the application instance #3 by the client whose IP address belongs to 10.6.6.6-10.7.7.7 is 5 ms; a communication delay of accessing the application instance #4 by the client whose IP address belongs to 10.1.1.1-10.2.2.2 is 25 ms; and a communication delay of accessing the application instance #5 by the client whose IP address belongs to 10.3.3.3-10.4.4.4 is 5 ms.

It should be understood that, if there is only one network segment of a specified operator in a specified region, the global management platform does not perform a step of allocating a network segment for which each application instance is responsible. In this case, each application instance is responsible for the only one network segment in this region.

Figure 3:
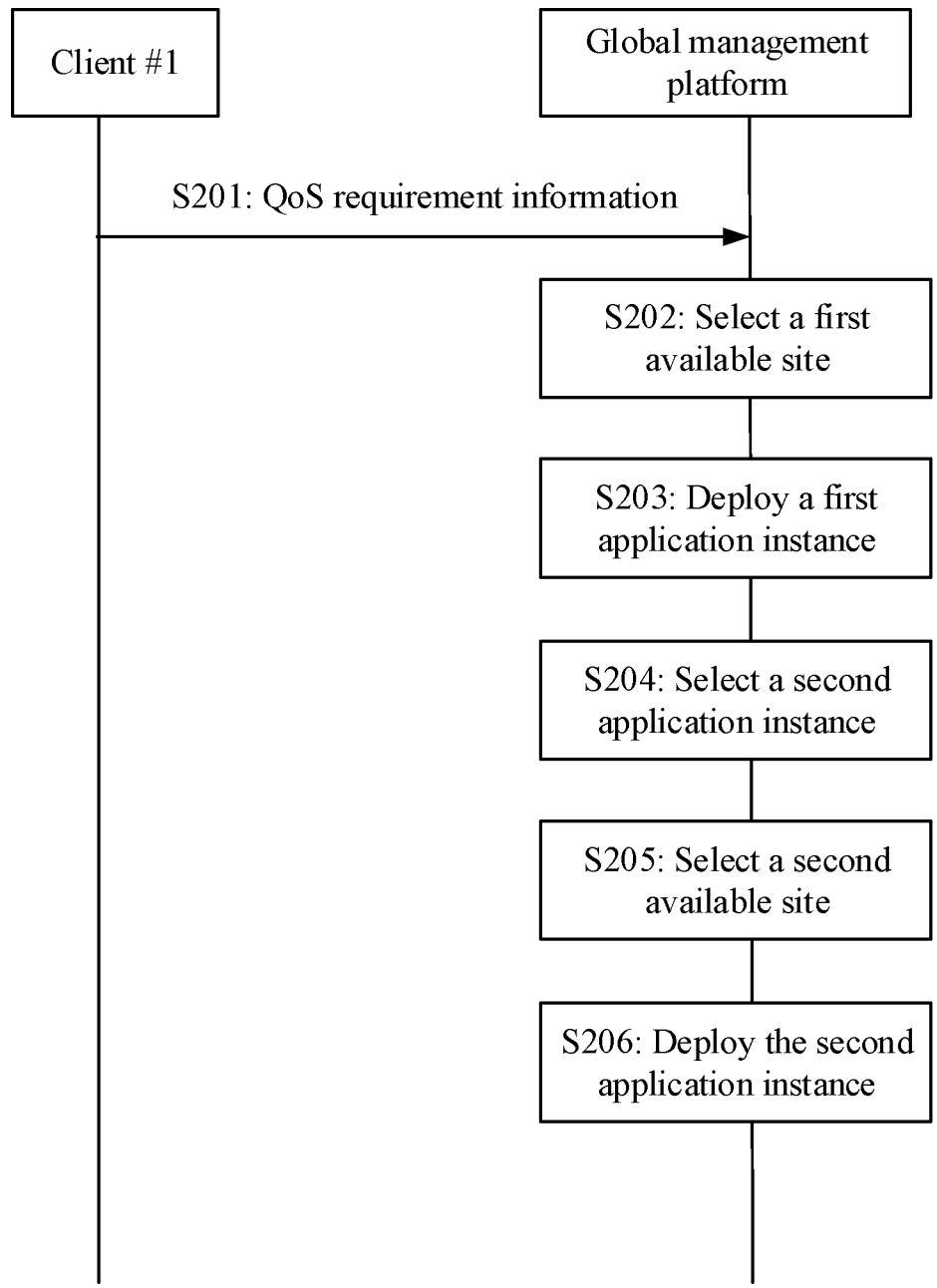

In some implementations, the global management platform may further adjust a deployment location of the first application instance according to the second delay requirement. In this case, as shown in FIG. 3, the method 200 may further include S204 to S206.

S204: The global management platform selects a second application instance that does not meet the second delay requirement from the one or more deployed first application instances.

For example, the second delay requirement information is an expected delay of 5 ms, and the deployed first application instances are the application instance #1 to the application instance #5 described above. As described above, the communication delay of accessing the application instance #1 by the client whose IP address belongs to 10.1.1.1-10.2.2.2 is 5 ms; the communication delay of accessing the application instance #2 by the client whose IP address belongs to 10.3.3.3-10.4.4.4 is 15 ms; the communication delay of accessing the application instance #3 by the client whose IP address belongs to 10.6.6.6-10.7.7.7 is 5 ms; the communication delay of accessing the application instance #4 by the client whose IP address belongs to 10.1.1.1-10.2.2.2 is 25 ms; and the communication delay of accessing the application instance #5 by the client whose IP address belongs to 10.3.3.3-10.4.4.4 is 5 ms.

Therefore, the application instance #2 and the application instance #4 may be determined as second application instances that do not meet the second delay requirement.

S205: The global management platform selects a second available site that meets the second delay requirement from the managed sites.

Optionally, the global management platform selects the second available site that meets the second delay requirement from all or some of the managed sites.

The global management platform may obtain, through filtering based on the locally stored site QoS information, the second available site that meets the second delay requirement information.

Optionally, the global management platform may obtain, through filtering based on the first global QoS information table, the second available site that meets the second delay requirement.

An example in which the application instance #2 and the application instance #4 are second application instances is used. It may be learned from Table 1 that the communication delay of accessing the site #3 by the client whose IP address belongs to 10.3.3.3-10.4.4.4 is 5 ms, which meets the second delay requirement; and the communication delay of accessing the site #1 by the client whose IP address belongs to 10.1.1.1-10.2.2.2 is 5 ms, which meets the second delay requirement. Therefore, the global management platform may determine the site #1 and the site #3 as second available sites.

S206: The global management platform deploys the second application instance on the second available site.

After selecting the second application instance that does not meet the second delay requirement, the global management platform may obtain, through querying based on the first QoS information table, an optimal deployment location of a network segment for which the second application instance is responsible, and move the second application instance. Then, if it is learned, through computing, that a total communication delay of accessing all the application instances by a client after the second application instance is moved is better than an original total communication delay, a deployment location of the second application instance is changed.

An example in which the application instance #2 and the application instance #4 are second application instances is used. It may be learned from Table 1 that the communication delay of accessing the site #3 by the client whose IP address belongs to 10.3.3.3-10.4.4.4 is 5 ms. Therefore, the global management platform may move the application instance #2 from the site #1 to the site #3. After the application instance #2 is moved, the total communication delay of accessing the application instance #1 to the application instance #5 by the client is 45 ms, and is less than the original total communication delay 55 ms. Therefore, the deployment location of the application instance #2 is changed to the site #3.

It may be learned from Table 1 that the communication delay of accessing the site #1 by the client whose IP address belongs to 10.1.1.1-10.2.2.2 is the smallest. Therefore, the application instance #4 is moved from the site #3 to the site #1. After the application instance #4 is moved, the total communication delay of accessing all the application instances by the client is 25 ms, and is less than the original total communication delay 45 ms. Therefore, the deployment location of the application instance #4 is changed to the site #1.

It may be understood that, in S205 and S206, a scheduling target of moving the deployment location of the first application instance by the global management platform is that all network segments within coverage of the first application instance are provided by the specified operator.

It should be noted that a termination condition of the foregoing deployment location update process is as follows: (1) All network segments within coverage of an application instance meet a user-expected delay; or (2) a scheduling time is greater than one minute. The foregoing update process is terminated as long as either of the termination conditions is met.

For example, in a process of updating the deployment locations of the application instance #2 and the application instance #4, if the scheduling time reaches one minute after the deployment location of the application instance #2 is updated, the foregoing update process is terminated even if a step of updating the application instance #4 is not completed. For another example, if the application instance #2 and the application instance #4 are updated within one minute, all network segments within coverage of the application instances meet the user-expected delay. In this case, the update process is terminated.

Figure 4:
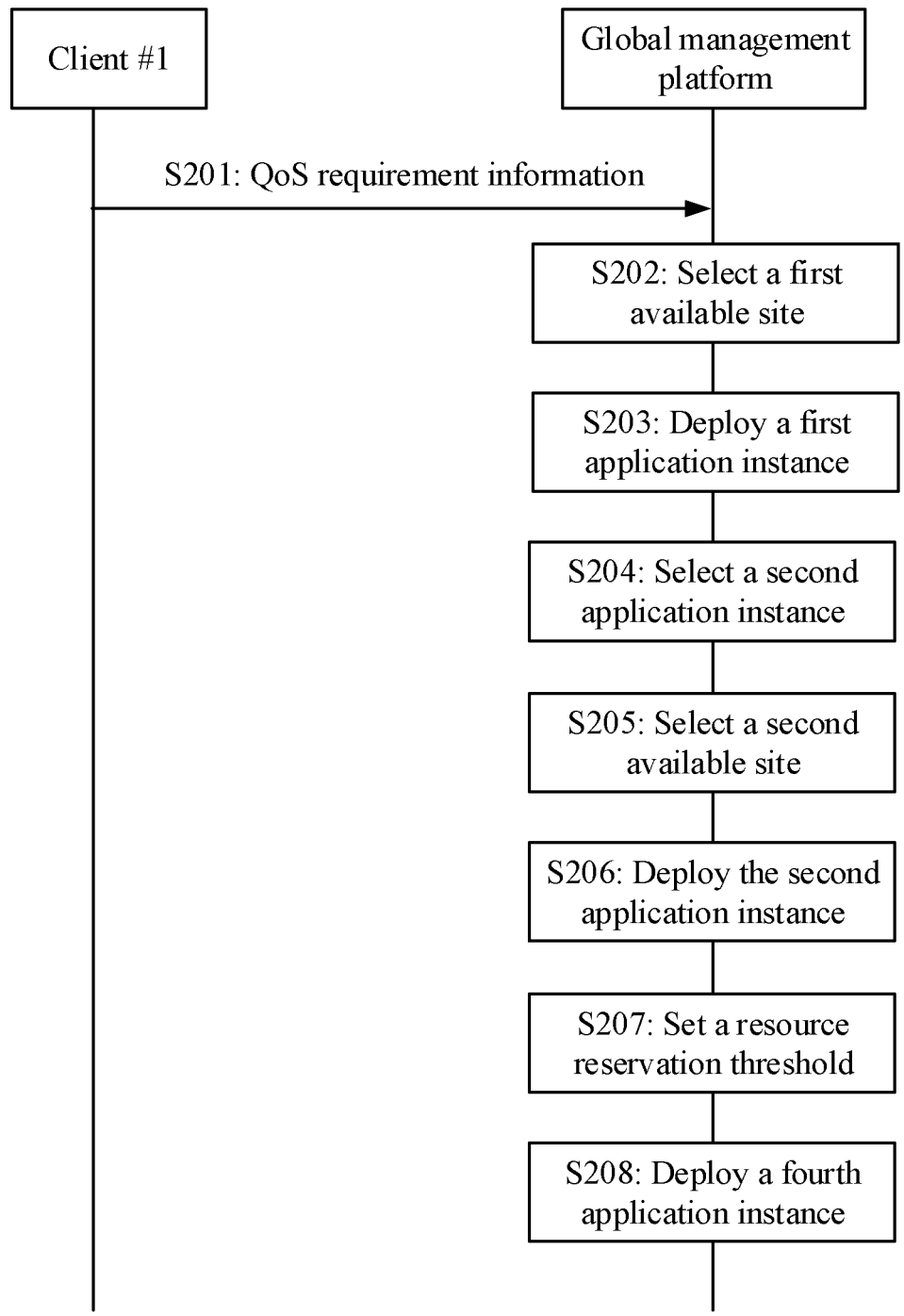

It may be understood that, after a period of time, a maximum quantity of connections to some application instances may appear. If a new client requests an application instance, an available application instance cannot be scheduled for the client. In this case, as shown in FIG. 4, the method 200 may further include S207 and S208.

S207: The global management platform sets a resource reservation value based on a quantity of connections that can be established to a third application instance deployed on a first site.

The quantity of connections that can be established may be a maximum quantity of connections to the deployed third application instance. The resource reservation threshold may be, for example, 20% of the maximum quantity of connections to the third application instance. In addition, in a case in which a quantity of remaining connections to the third application instance is less than the resource reservation threshold, a new application instance is deployed in advance, so as to meet access of more clients.

Optionally, for sites of different QoS levels, the global management platform may set different resource reservation thresholds.

As an example, for sites of different QoS levels, the global management platform may set fixed resource reservation thresholds. For example, for a site whose QoS level is 99, the global management platform may set 10% of a maximum quantity of connections to the site as the resource reservation threshold; for a site whose QoS level is 9999, the global management platform may set 40% of a maximum quantity of connections to the site as the resource reservation threshold; and for a site of a highest priority, the global management platform may set 100% of a maximum quantity of connections to the site as the resource reservation threshold.

As another example, for a site of each QoS level, the global management platform may dynamically adjust the resource reservation threshold based on historical access data corresponding to a period of time (for example, one year). If there are a relatively large quantity of clients #2 accessing a site of a specific QoS level within a period of time, the resource reservation threshold is increased; or if there are a relatively small quantity of clients #2 accessing a site of a specific QoS level within a period of time, the resource reservation threshold is reduced. For example, in the previous year, there are a relatively small quantity of clients #2 accessing the site whose QoS level is 9999, so that the global management platform can reduce reserved resources from 40% to 20%.

S208: The global management platform deploys a fourth application instance on the first site.

QoS information of the fourth application instance is the same as or equal to that of the third application instance. For example, if the third application instance is deployed on the first site, and a network segment for which the third application instance is responsible is 10.1.1.1-10.2.2.2, and the maximum quantity of connections is 2000, the fourth application instance is also deployed on the first site, the fourth application instance is also responsible for 10.1.1.1-10.2.2.2, and a maximum quantity of connections is 2000.

Related information for deploying the fourth application parameter may be determined based on related information for deploying the third application instance. In addition, the global management platform may further determine a quantity of fourth application instances.

A method in which the global management platform determines the quantity of fourth application instances may include the following steps:

Step 1: The global management platform predicts an increase of a quantity of connections to a first network segment based on historical access data. The first network segment is a network segment carried by the third application instance.

For example, within a period of time, the global management platform collects statistics about network segments in which IP addresses of all clients accessing a same service domain name are located. Then, the global management platform counts a quantity of clients whose IP addresses belong to the first network segment. Subsequently, the global management platform predicts the increase of the quantity of connections to the first network segment based on the quantity of clients. For example, the increase of the quantity of connections to the first network segment may be 100 times of the quantity of clients corresponding to the first network segment.

Step 2: The global management platform computes, based on the predicted increase of the quantity of connections to the first network segment, a quantity of fourth application instances that need to be added.

The quantity of fourth application instances that need to be added is obtained by dividing the increase of the quantity of connections to the first network segment by a maximum quantity of connections to the fourth application instance. The maximum quantity of connections to the fourth application instance is equal to the maximum quantity of connections to the third application instance.

Step 3: The global management platform deploys the fourth application instance on the first site.

In this embodiment of this application, the global management platform may deploy an application instance based on delay requirement information that can be accepted by the user, so that the global management platform can provide the user with a service required by the user. The global management platform may further update an application instance deployment location based on the delay requirement information expected by the user, so that the global management platform can provide the user with a better service. For example, the global management platform can provide the user with a service of a delay and high traffic.

After the global management platform completes the application instance deployment, the global management platform may record an application instance identifier, a network segment for which an application instance is responsible, and QoS information of the application instance, so as to establish a second QoS information table.

Table 2 provides an example of the second QoS information table.

TABLE 2

| Service domain name | Application instance identifier | Site identifier | Bearer network segment | Delay | Quantity of connections |
|---|---|---|---|---|---|
| 1111 | Application instance #1 | Site # 1 | 10.1.1.1-10.2.2.2 | 5 ms | 2000 |
| 1111 | Application instance #2 | Site # 3 | 10.3.3.3-10.4.4.4 | 5 ms | 1500 |
| 1111 | Application instance #3 | Site # 2 | 10.6.6.6-10.7.7.7 | 5 ms | 1000 |
| 1111 | Application instance #4 | Site # 1 | 10.1.1.1-10.2.2.2 | 5 ms | 1000 |
| 1111 | Application instance #5 | Site # 3 | 10.3.3.3-10.4.4.4 | 5 ms | 800 |

The application instance identifier is used to identify an application instance. The application instance identifier may be a number allocated by the global management platform to each application instance. The quantity of connections is a quantity of currently connected users for an application instance.

Figure 5:
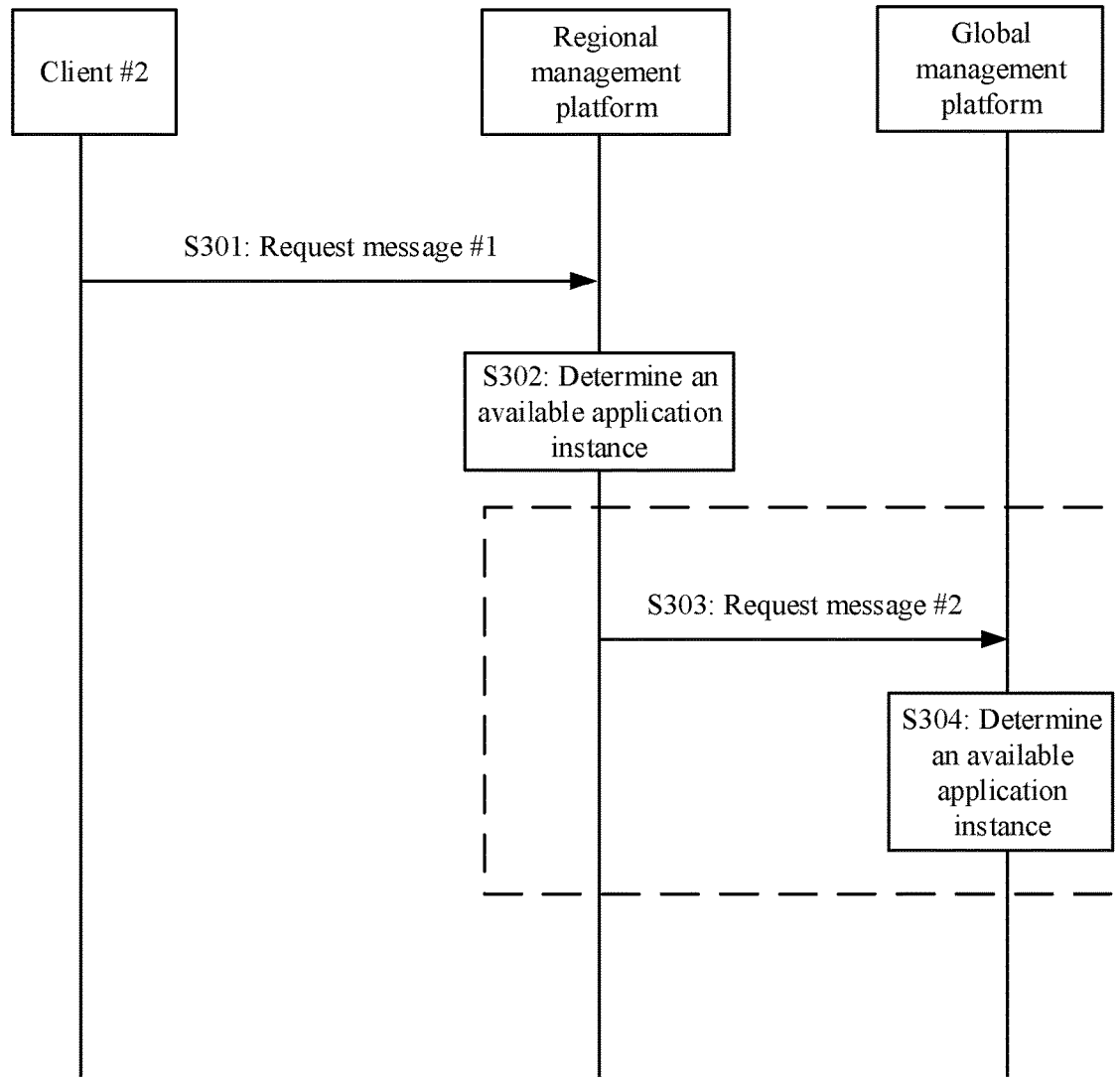
FIG. 5 is a schematic flowchart of an application instance scheduling method according to an embodiment of this application.

With reference to FIG. 2 to FIG. 4, the foregoing describes the application instance deployment method according to the embodiment of this application. With reference to FIG. 5, the following describes an application instance scheduling method according to an embodiment of this application.

FIG. 5 is a schematic flowchart of the application instance scheduling method according to the embodiment of this application. As shown in FIG. 5, the method 300 includes S301 to S304. Each step is described in detail below.

S301: A regional management platform receives a request message #1 (for example, a second request message) from a client #2 (for example, a second client), where the request message #1 is used to request the regional management platform to allocate an application instance to the client #2.

The request message #1 carries an address and IP information of the client #2.

Optionally, the request message #1 may further carry a third delay requirement entered by a second user to the client #2. The third delay requirement may be a delay expected by the second user.

It may be understood that the request message #1 may be sent by the second user using the client #2 to the regional management platform by using the client #2. For example, when the second user accesses a service domain name by using the client #2, the client #2 sends the request message #1 to a regional management platform that is nearest to the client #2.

As shown in FIG. 1, if the service domain name accessed by the second user by using the client #2 is 1111, and an edge cloud that is nearest to the client #2 is the edge cloud #1, the client #2 sends the request message #1 to the regional management platform #1 in the edge cloud #1, so as to request the regional management platform #1 to allocate an application instance to the client #2. The address information carried in the request message #1 is an address of the client #2, and the IP information of the client #2 that is carried in the request message #1 is an IP address of the client. As shown in FIG. 1, the IP address of the client #2 is 10.1.1.3.

S302: The regional management platform obtains an available application instance from one or more fifth application instances through filtering based on business QoS information table, and redirects the available application instance to an IP address of an optimal application instance.

The business QoS information table is established by the regional management platform for a site included in an edge cloud to which the regional management platform belongs and an application instance deployed on the site. The fifth application instance is an application instance deployed by a global management platform based on QoS requirement information from the client #1 on a site managed by the regional management platform.

As shown in FIG. 1, the regional management platform #1 manages the site #1 and the site #2, and the regional management platform #2 manages the site #3 and the site #4. Therefore, a business QoS information table established by the regional management platform #1 is shown in Table 3.

TABLE 3

| Service domain name | Application instance identifier | Site identifier | Bearer network segment | Delay | Quantity of connections |
|---|---|---|---|---|---|
| 1111 | Application instance #1 | Site # 1 | 10.1.1.1-10.2.2.2 | 5 ms | 2000 |
| 1111 | Application instance #3 | Site # 2 | 10.6.6.6-10.7.7.7 | 5 ms | 1000 |
| 1111 | Application instance #4 | Site # 1 | 10.1.1.1-10.2.2.2 | 5 ms | 1000 |

A business QoS information table established by the regional management platform #2 is shown in Table 4.

TABLE 4

| Service domain name | Application instance identifier | Site identifier | Bearer network segment | Delay | Quantity of connections |
|---|---|---|---|---|---|
| 1111 | Application instance #2 | Site # 3 | 10.3.3.3-10.4.4.4 | 5 ms | 1500 |
| 1111 | Application instance #5 | Site # 3 | 10.3.3.3-10.4.4.4 | 5 ms | 800 |

After receiving the request message #1 from the client #2, the regional management platform may first allocate a nearest application instance to the client #2 based on the address information in the request message #1. Then, the regional management platform determines, based on the IP address carried in the request message #1, a network segment in which the IP address is located. Subsequently, the regional management platform finds, based on the business QoS information table, an application instance that is responsible for the network segment. Finally, the regional management platform determines, based on QoS information corresponding to the application instance, whether the application instance is available.

For example, the regional management platform determines whether a quantity of connections to a site in which the application instance is located reaches a maximum value; and if the quantity of connections reaches the maximum value, the application instance is unavailable; or if the quantity of connections does not reach the maximum value, the application instance is available.

For another example, if the request message #1 sent by the client to the regional management platform further carries the third delay requirement, the regional management platform may further determine whether a communication delay corresponding to the application instance meets the third delay requirement; and if the communication delay meets the third delay requirement, the application instance is available; or if the communication delay does not meet the third delay requirement, the application instance is unavailable.

As shown in FIG. 1, the IP address of the client #2 is 10.1.1.3. After receiving the request message #1 from the client #2, the regional management platform #1 allocates the nearest application instance #1 to the client #2. Then, the regional management platform determines, based on the IP address carried in the request message #1, that the network segment in which the IP address is located is 10.1.1.1. Subsequently, the regional management platform #1 finds, according to Table 3, that application instances that are responsible for 10.1.1.1 are the application instance #1 and the application instance #4.

In a process in which the first user creates an edge application instance, an example in which a value assigned to a parameter "maxlinksPerinstance" is 2000 is used. The regional management platform may learn from Table 3 that a current quantity of connections to the application instance #1 reaches the maximum quantity of connections. Therefore, the application instance #1 is unavailable. However, a current quantity of connections to the application instance #4 is 1000, which does not reach the maximum quantity of connections. Therefore, the application instance #4 is available.

It may be learned from Table 3 that a communication delay corresponding to the application instance #4 is 5 ms. If the request message #1 sent by the client to the regional management platform #1 carries the third delay requirement, and the third delay requirement is less than 5 ms, the application instance #4 is also unavailable; or if the third delay requirement is greater than or equal to 5 ms, the application instance #4 is available.

If the regional management platform determines, based on the request message #1 from the client and the business QoS information table, that all application instances are unavailable, the method 300 may further perform S304 and S305.

S303: The regional management platform sends a request message #2 (for example, a first request message) to the global management platform, where the request message #2 is used to request to allocate an application instance to the client #2.

Content of the request message #2 corresponds to that of the request message #1. For example, if the request message #1 carries the address and the IP information of the client #2, the request message #2 also carries the address and the IP information of the client #2. For another example, if the request message #1 carries the address and the IP information of the client #2 and the third delay requirement, the request message #2 also carries the address and the IP information of the client #2 and the third delay requirement.

S304: The global management platform obtains an available application instance from one or more first application instances through filtering based on a second QoS information table, and directs the available application instance to the IP address of the optimal application instance.

After receiving the request message #2 from the regional management platform, the global management platform first allocates a nearest application instance to the client #2 based on the address information carried in the request message #2; and then determines, based on the IP address, a network segment in which the IP address is located. Subsequently, the global management platform finds, based on the business QoS information, an application instance that is responsible for the network segment. Finally, the global management platform determines, based on QoS information corresponding to the application instance, whether the application instance is available.

For example, the global management platform determines whether a quantity of connections to a site in which the application instance is located reaches a maximum value; and if the quantity of connections reaches the maximum value, the application instance is unavailable; or if the quantity of connections does not reach the maximum value, the application instance is available.

For another example, if the request message #2 sent by the client #2 to the global management platform further includes the third delay requirement, the global management platform may further determine whether a communication delay corresponding to the application instance meets the third delay requirement; and if the communication delay meets the third delay requirement, the application instance is available; or if the communication delay does not meet the third delay requirement, the application instance is unavailable.

As shown in FIG. 1, the IP address of the client #2 is 10.3.3.5. After receiving the request message #2 from the regional management platform #1, the global management platform allocates the nearest application instance #1 to the client #2, and then determines, based on the IP address carried in the request message #2, that the network segment in which the IP address is located is 10.3.3.3.

Subsequently, the global management platform finds, according to Table 2, that application instances that are responsible for 10.3.3.3 are the application instance #2 and the application instance #5. In a process in which a user creates an edge application instance, an example in which a value assigned to a parameter "maxlinksPerinstance" is 2000 is used. The global management platform may learn from Table 2 that a current quantity of connections to the application instance #2 and a current quantity of connections to the application instance #5 do not reach the maximum quantity of connections. Therefore, the application instance #2 and the application instance #5 are available.

It may be learned from Table 2 that communication delays corresponding to the application instance #2 and the application instance #5 are both 5 ms. If the request message #2 sent by the regional management platform #1 to the global management platform carries the third delay requirement, and the third delay requirement is less than 5 ms, the application instance #2 and the application instance #5 are also unavailable; or if the third delay requirement is greater than or equal to 5 ms, the application instance #2 and the application instance #5 are available.

If the global management platform determines, based on the request message #2 and the second QoS information table, that there is an available application instance, the global management platform sends a response message to the client. The response message carries an identifier of the available application instance. In addition, the response message is further used to enable the client to redirect to an edge cloud that manages the site in which the available application instance is located.

If the global management platform determines, based on the request message #2 and the second QoS information table, that there is no available application instance, the global management platform enables resource scheduling, and adds a new application instance to meet a user service request.

Optionally, the regional management platform or the global management platform may schedule an application instance for the client #2 based on a QoS level of the client #2.

For example, the regional management platform or the global management platform preferentially schedules an application instance for a client #2 of a high QoS level.

This embodiment of this application imposes no limitation on a manner of determining the QoS level of the client #2.

For example, a QoS level management device sets the QoS level of the client #2 based on a percentage of a total quantity of requests that are met by the client #2 in a total quantity of requests of the client #2. This percentage may be computed in a unit of year. If the percentage of the total quantity of requests that are met by the client #2 in the total quantity of requests of the client #2 is 99%, the QoS level management device sets the QoS level of the client #2 to 99. If the percentage of the total quantity of requests that are met by the client #2 in the total quantity of requests of the client #2 is 99.99%, the QoS level management device sets the QoS level of the client #2 to 9999.

It may be understood that, in a case in which the client #2 initially accesses the regional management platform or the global management platform, it may be considered that either the regional management platform or the global management platform may meet the request of the client #2.

Optionally, in an extreme case (for example, a case in which reserved resources are used up and no application instance is added), a client #2 of a high QoS level may preempt an example resource of a client #2 of a low QoS level. For example, the client #2 whose QoS level is 9999 may preempt an example resource of the client #2 whose QoS level is 99.

With reference to FIG. 3, the foregoing shows a process in which a client requests a regional management platform to allocate an application instance. It should be understood that the client #1 may further directly send the request message #1 to the global management platform, so as to request the global management platform cloud to allocate an application instance to the client. For a method in which the client #1 directly requests the global management platform to allocate an application instance to the client, refer to the foregoing descriptions of S303 and S304. For brevity, details are not described in this embodiment of this application.

With reference to FIG. 2 to FIG. 5, the foregoing describes in detail the application instance deployment method and the application instance scheduling method according to the embodiments of this application. The following describes in detail apparatuses provided in the embodiments of this application with reference to FIG. 6 to FIG. 11.

Figure 6:
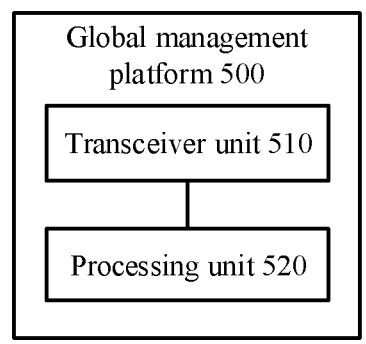
FIG. 6 and FIG. 7 are schematic block diagrams of a global management platform according to an embodiment of this application.

FIG. 6 is a schematic block diagram of a global management platform 500 according to an embodiment of this application. As shown in the figure, the global management platform 500 may include a transceiver unit 510 and a processing unit 520.

Specifically, the global management platform 500 may include units configured to perform the method performed by the global management platform in the method 200 in FIG. 2 to FIG. 4 and the method 300 in FIG. 5. In addition, the units in the global management platform 500 and the foregoing other operations and/or functions are respectively used to implement corresponding procedures of the method 200 in FIG. 2 to FIG. 4 and the method 300 in FIG. 5. It should be understood that, a specific process in which each unit performs the foregoing corresponding step has been described in detail in the foregoing method embodiments. For brevity, details are not described herein again.

Figure 7:
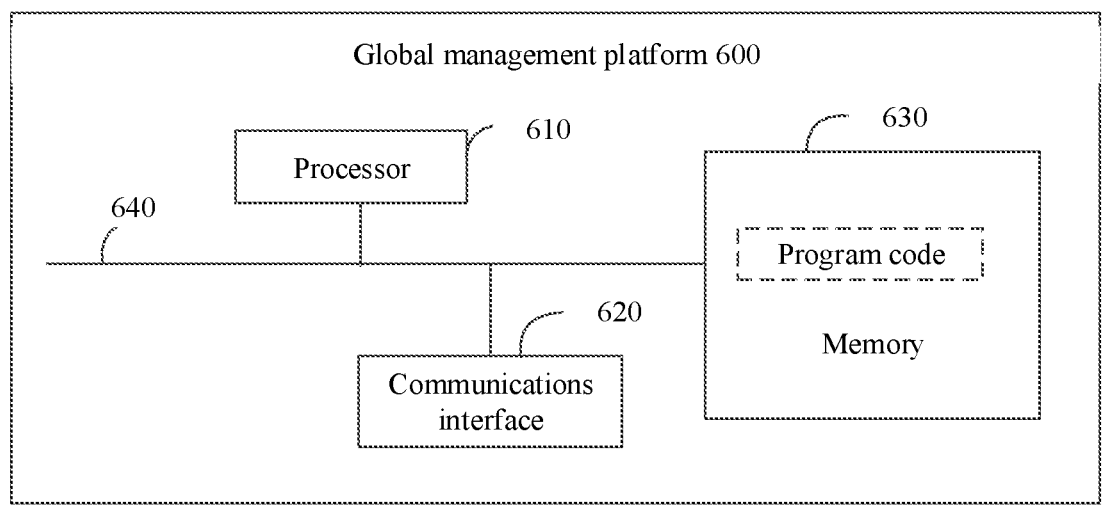

It should be understood that the transceiver unit in the global management platform 500 may correspond to a communications interface 620 in a global management platform 600 shown in FIG. 7, and the processing unit 520 in the global management platform 500 may correspond to a processor 610 in the global management platform 600 shown in FIG. 7.

FIG. 7 is a schematic block diagram of the global management platform 600 according to an embodiment of this application. As shown in the figure, the global management platform 600 may include the communications interface 620, the processor 610, and a memory 630.

Optionally, the global management platform 600 may further include a bus 640. The communications interface 620, the processor 610, and the memory 630 may be connected to each other by using the bus 640. The bus 640 may be a peripheral component interconnect (peripheral component interconnect, PCI) bus, an extended industry standard architecture (extended industry standard architecture, EISA) bus, or the like. The bus 640 may be classified as an address bus, a data bus, a control bus, and the like. For ease of representation, only one thick line is used to represent the bus in FIG. 7, but this does not mean that there is only one bus or only one type of bus.

The memory 630 may be configured to store program code and data of the computer system. Therefore, the memory 630 may be a storage unit in the processor 610, an external storage unit independent of the processor 610, or a component including the storage unit in the processor 610 and the external storage unit independent of the processor 610.

The processor 610 may include one or more general-purpose processors. For example, the processor may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. The processor may alternatively be a combination of implementing a computing function, for example, a combination of a plurality of microprocessors or a combination of a DSP and a microprocessor. The processor 610 may be configured to run a program of a processing function in related program code. In other words, the processor 610 may implement functions of a determining module and a creation module by executing the program code. For specific functions of the determining module and the creation module, refer to the related descriptions in the foregoing embodiment.

In a possible implementation, the processor 610 is configured to run related program code, so as to implement the method in S202 to S208 shown in FIG. 2 to FIG. 4 in this application or implement the method in S304 shown in FIG. 5 in this application, and/or implement other steps of the technology described in this specification, and/or the like. Detailed descriptions and limitations are not provided herein in this application.

The communications interface 620 may be a wired interface (for example, an Ethernet interface) or a wireless interface (for example, a cellular network interface or a wireless local area network interface), and is configured to communicate with another module/device.

The memory 630 may include a volatile memory (volatile memory), such as a random access memory (random access memory, RAM). The memory may also include a non-volatile memory (non-volatile memory), such as a read-only memory (read-only memory, ROM), a flash memory (flash memory), a hard disk drive (hard disk drive, HDD), or a solid-state drive (solid-state drive, SSD). The memory 630 may further include a combination of the foregoing types of memories. The memory 630 may be configured to store a group of program code, so that the processor 610 invokes the program code stored in the memory 630 to implement functions of the communications module and/or the processing module in the embodiments of the present invention.

When the program code in the memory 630 is executed by the processor 610, the global management platform 600 is enabled to perform the method in the foregoing method embodiment 200 or 300.

Figure 8:
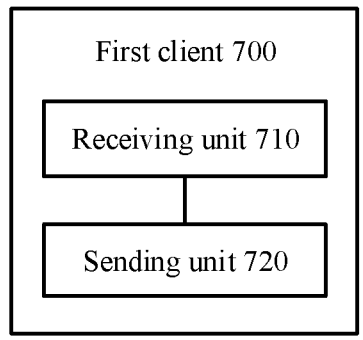
FIG. 8 and FIG. 9 are schematic block diagrams of a first client according to an embodiment of this application.

FIG. 8 is a schematic block diagram of a first client 700 according to an embodiment of this application. As shown in the figure, the first client 700 may include a receiving unit 710 and a sending unit 720.

Specifically, the first client 700 may include units configured to perform the method performed by the first client in the method 200 in FIG. 2. In addition, the units in the first client 700 and the foregoing other operations and/or functions are respectively used to implement corresponding procedures of the method 200 in FIG. 2 to FIG. 4. It should be understood that, a specific process in which each unit performs the foregoing corresponding step has been described in detail in the foregoing method embodiments. For brevity, details are not described herein again.

Figure 9:
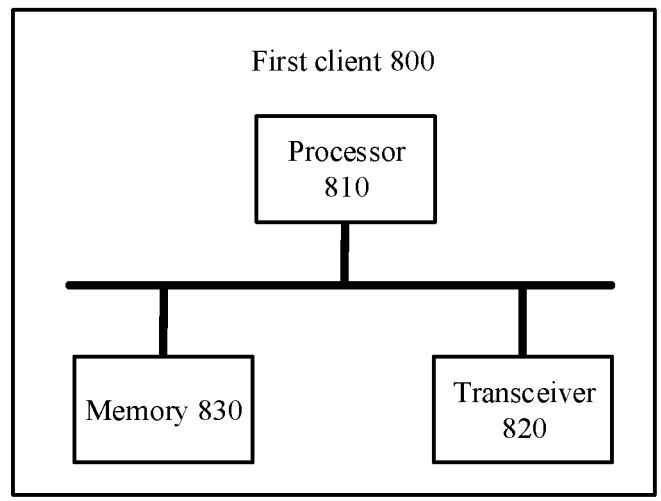

It should be understood that the receiving unit and the sending unit in the first client 700 may correspond to a transceiver 820 in a first client 800 shown in FIG. 9.

FIG. 9 is a schematic block diagram of the first client 800 according to an embodiment of this application. As shown in the figure, the first client 800 includes a processor 810 and the transceiver 820. The processor 810 is coupled to a memory, and is configured to execute instructions stored in the memory, to control the transceiver 820 to send a signal and/or receive a signal. Optionally, the first client 800 further includes a memory 830, configured to store instructions.

It should be understood that the processor 810 and the memory 830 may be integrated into one processing apparatus. The processor 810 is configured to execute program code stored in the memory 830 to implement the foregoing functions. During specific implementation, the memory 830 may alternatively be integrated into the processor 810, or may be independent of the processor 810.

It should be further understood that the transceiver 820 may include a receiver (or referred to as a receive machine)

and a transmitter (or referred to as a transmit machine). The transceiver may further include an antenna. There may be one or more antennas.

Specifically, the first client 800 may include units configured to perform the method performed by the first client in the method 200 in FIG. 2. In addition, the units in the first client 800 and the foregoing other operations and/or functions are respectively used to implement corresponding procedures of the method 200 in FIG. 2 to FIG. 4. It should be understood that, a specific process in which each unit performs the foregoing corresponding step has been described in detail in the foregoing method embodiments. For brevity, details are not described herein again.

Figure 10:
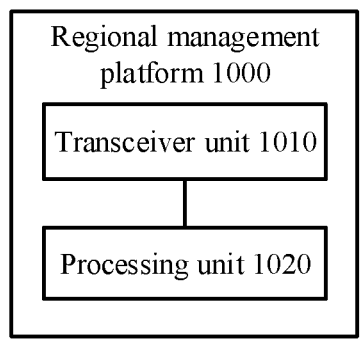
FIG. 10 and FIG. 11 are schematic block diagrams of a regional management platform according to an embodiment of this application.

FIG. 10 is a schematic block diagram of a regional management platform 1000 according to an embodiment of this application. As shown in the figure, the regional management platform 1000 may include a transceiver unit 1010 and a processing unit 1020.

Specifically, the regional management platform 1000 may include units configured to perform the method performed by the regional management platform in the method 300 in FIG. 5. In addition, the units in the regional management platform 1000 and the foregoing other operations and/or functions are respectively used to implement corresponding procedures of the method 300 in FIG. 5. It should be understood that, a specific process in which each unit performs the foregoing corresponding step has been described in detail in the foregoing method embodiments. For brevity, details are not described herein again.

Figure 11:
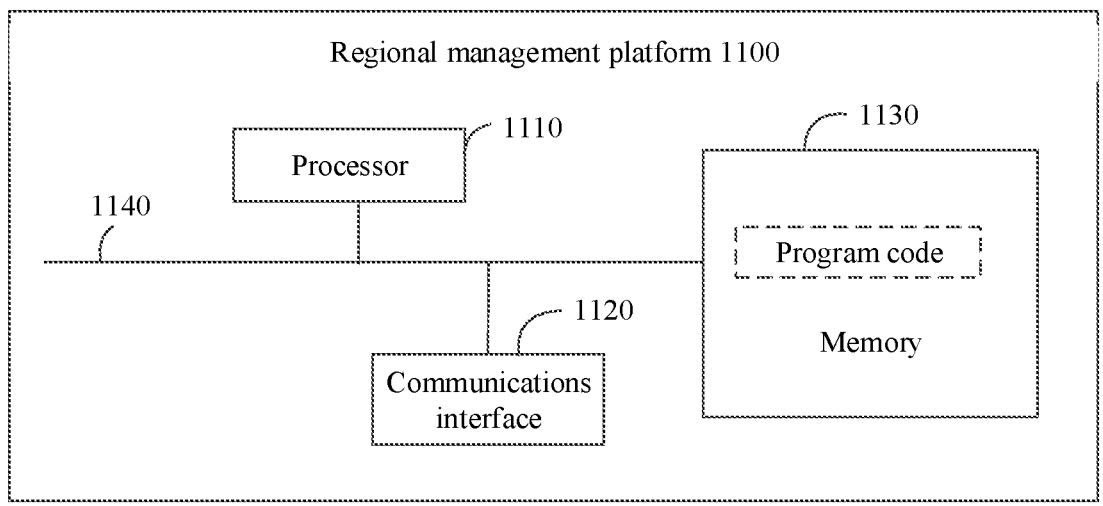

It should be understood that the transceiver unit in the regional management platform 1000 may correspond to a communications interface 1120 in the regional management platform 1100 shown in FIG. 11, and the processing unit 1020 in the regional management platform 1000 may correspond to a processor 1110 in the regional management platform 1100 shown in FIG. 11.

FIG. 11 is a schematic block diagram of the regional management platform 1100 according to an embodiment of this application. As shown in the figure, the regional management platform 1100 may include the communications interface 1120, the processor 1110, and a memory 1130.

Optionally, the regional management platform 1100 may further include a bus 1140. The communications interface 1120, the processor 1110, and the memory 1130 are connected to each other by using the bus 1140. The bus 1140 may be a PCI bus, an EISA bus, or the like. The bus 1140 may be classified into an address bus, a data bus, a control bus, or the like. For ease of representation, only one thick line is used to represent the bus in FIG. 11, but this does not mean that there is only one bus or only one type of bus.

The memory 1130 may be configured to store program code and data of the computer system. Therefore, the memory 1130 may be a storage unit in the processor 1110, an external storage unit independent of the processor 1110, or a component including the storage unit in the processor 1110 and the external storage unit independent of the processor 1110.

The processor 1110 may include one or more general-purpose processors. For example, the processor may be a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. The processor may alternatively be a combination of implementing a computing function, for example, a combination of a plurality of microprocessors or a combination of a DSP and a microprocessor. The processor 1110 may be configured to run a program of a processing function in related program code. In other words, the processor 1110 may implement functions of a determining module and a creation module by executing the program code. For specific functions of the determining module and the creation module, refer to the related descriptions in the foregoing embodiments.

In a possible implementation, the processor 1110 is configured to run related program code, so as to implement the method in S302 shown in FIG. 5 in this application, and/or implement other steps of the technology described in this specification, and/or the like. Detailed descriptions and limitations are not provided herein in this application.

The communications interface 1120 may be a wired interface (for example, an Ethernet interface) or a wireless interface (for example, a cellular network interface or a wireless local area network interface), and is configured to communicate with another module/device.

The memory 1130 may include a volatile memory (volatile memory), for example, a RAM. Alternatively, the memory may include a non-volatile memory (non-volatile memory), for example, a ROM, a flash memory (flash memory), an HDD, or an SSD. Alternatively, the memory 1130 may include a combination of the foregoing types of memories. The memory 1130 may be configured to store a group of program code, so that the processor 1110 invokes the program code stored in the memory 1130 to implement functions of the communications module and/or the processing module in the embodiments of the present invention.

When the program code in the memory 1130 is executed by the processor 1110, the regional management platform 1100 is enabled to perform the method in the foregoing method embodiment 300.

According to the methods provided in the embodiments of this application, this application further provides a computer program product. The computer program product includes computer program code. When the computer program code is run on a computer, the computer is enabled to perform the method in any one of the embodiments shown in FIG. 2 to FIG. 5.

According to the methods provided in the embodiments of this application, this application further provides a computer-readable medium. The computer-readable medium stores program code. When the program code is run on a computer, the computer is enabled to perform the method in any one of the embodiments shown in FIG. 2 to FIG. 5.

According to the methods provided in the embodiments of this application, this application further provides a system. The system includes the foregoing global management platform, the foregoing first client, and the foregoing regional management platform.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-dense digital video disc (digital video disc, DVD)), a semiconductor medium (for example, a solid-state drive (solid-state drive, SSD)), or the like.

The network elements in the foregoing apparatus embodiments may totally correspond to the network elements in the method embodiments. A corresponding module or unit performs a corresponding step. For example, a transceiver unit (transceiver) performs a receiving step or a sending step in the method embodiments, and a processing unit (a processor) may perform another step other than the sending step and the receiving step. For a function of a specific unit, refer to a corresponding method embodiment. There may be one or more processors.

It should be understood that "one embodiment" or "an embodiment" mentioned throughout the specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

The terms such as "unit", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application instance deployment method, comprising:
   receiving, by a global management platform, quality of service (QOS) requirement information from a first client, wherein the QoS requirement information comprises a first delay requirement, a second delay requirement, and a first quantity of connections, wherein the first delay requirement represents a maximum accepted delay, and the second delay requirement represents an expected delay, and the second delay requirement represents a smaller delay than the first delay requirement;
   selecting, by the global management platform, a first available site that meets the first delay requirement, wherein the first available site is selected from among sites managed by the global management platform;
   deploying, by the global management platform, one or more first application instances on the first available site, wherein a quantity of connections that can be established to the one or more first application instances is less than or equal to the first quantity of connections;
   determining a first total communication delay of accessing all the application instances by the first client;
   determining a second total communication delay of accessing all the application instances by the first client after a second application instance is moved;
   comparing the first total communication delay and the second total communication delay: and
   in response to determining that the second total communication delay is smaller than the first total communication delay, changing a deployment location of the second application instance according to a QoS information table.

2. The method according to claim 1, wherein the selecting, by the global management platform, a first available site comprises:
   selecting, by the global management platform based on a first global QoS information table, the first available site that meets the first delay requirement from among the sites managed by the global management platform, wherein the first global QoS information table comprises QoS information of the sites managed by the global management platform.

3. The method according to claim 1, wherein the method further comprises:
   selecting, by the global management platform, a second application instance that does not meet the second delay requirement, wherein the second application instance is selected from among the one or more first application instances;
   selecting, by the global management platform, a second available site that meets the second delay requirement, wherein the second available site is selected from among the managed sites; and
   deploying, by the global management platform, the second application instance on the second available site.

4. The method according to claim 1, wherein the method further comprises:
   setting, by the global management platform, a resource reservation threshold based on a quantity of connections that can be established to a third application instance deployed on a managed first site; and
   when a remaining quantity of connections to the managed first site is less than the resource reservation threshold, deploying, by the global management platform, a fourth application instance on the managed first site, wherein QoS information of the fourth application instance is the same as or equal to QoS information of the third application instance.

5. The method according to claim 1, wherein the method further comprises:
   receiving, by the global management platform, a first request message from a second client or a regional management platform, wherein the first request message is used to request to schedule an application instance for the second client, and the first request message comprises identification information of the second client; and
   obtaining, by the global management platform, an available application instance from the one or more first application instances through filtering based on the first request message and a second global QoS information table, wherein the second global QoS information table comprises QoS information of the one or more first application instances.

6. The method according to claim 5, wherein the first request message further comprises a third delay requirement.

7. A global management platform, comprising:
   at least one processor; and
   a memory interoperably coupled with the at least one processor and having tangible, non-transitory, machine-readable media storing one or more instructions that, when executed by the one or more processors, cause the one or more processors to perform operations comprising:
   receiving quality of service (QOS) requirement information from a first client, wherein the QoS requirement information comprises a first delay requirement, a second delay requirement, and a first quantity of connections, wherein the first delay requirement represents a maximum accepted delay, and the second delay requirement represents an expected delay, and the second delay requirement represents a smaller delay than the first delay requirement;
   selecting a first available site that meets the first delay requirement, wherein the first available site is selected from among managed sites;
   deploying one or more first application instances on the first available site, wherein a quantity of connections that can be established to the one or more first application instances is less than or equal to the first quantity of connections determining a first total communication delay of accessing all the application instances by the first client;
   determining a second total communication delay of accessing all the application instances by the first client after a second application instance is moved;
   comparing the first total communication delay and the second total communication delay; and
   in response to determining that the second total communication delay is smaller than the first total communication delay, changing a deployment location of the second application instance according to a QoS information table.

8. The global management platform according to claim 7, wherein the selecting a first available site comprises selecting, based on a first global QoS information table, the first available site that meets the first delay requirement from among the managed sites, wherein the first global QoS information table comprises QoS information of sites managed by the global management platform.

9. The global management platform according to claim 7, wherein the operations further comprise:
- selecting a second application instance that does not meet the second delay requirement from the one or more first application instances;
- selecting a second available site that meets the second delay requirement from among the managed sites; and
- deploying the second application instance on the second available site.

10. The global management platform according to claim 7, wherein the operations further comprise:
- setting a resource reservation threshold based on a quantity of connections that can be established to a third application instance deployed on a managed first site; and
- when a remaining quantity of connections to the managed first site is less than the resource reservation threshold, deploying a fourth application instance on the managed first site, wherein QOS information of the fourth application instance is the same as or equal to QoS information of the third application instance.

11. The global management platform according to claim 7, wherein the operations further comprise:
- receiving a first request message from a second client or a regional management platform, the first request message being used to request to schedule an application instance for the second client, and the first request message comprises identification information of the second client; and
- obtaining an available application instance from among the one or more first application instances through filtering based on the first request message and a second global QoS information table, wherein the second global QoS information table comprises QoS information of the one or more first application instance.

12. The global management platform according to claim 11, wherein the first request message further comprises a third delay requirement.

13. One or more non-transitory computer-readable media storing computer instructions, that when executed by one or more processors, cause a computing device to perform operations comprising:
- receiving, by a global management platform, quality of service (QOS) requirement information from a first client, wherein the QoS requirement information comprises a first delay requirement, a second delay requirement, and a first quantity of connections, wherein the first delay requirement represents a maximum accepted delay, and the second delay requirement represents an expected delay, and the second delay requirement represents a smaller delay than the first delay requirement;
- selecting, by the global management platform, a first available site that meets the first delay requirement, wherein the first available site is selected from among sites managed by the global management platform;
- deploying, by the global management platform, one or more first application instances on the first available site, wherein a quantity of connections that can be established to the one or more first application instances is less than or equal to the first quantity of connections;
- determining a first total communication delay of accessing all the application instances by the first client;
- determining a second total communication delay of accessing all the application instances by the first client after a second application instance is moved;
- comparing the first total communication delay and the second total communication delay; and
- in response to determining that the second total communication delay is smaller than the first total communication delay, changing a deployment location of the second application instance according to a QoS information table.

14. The one or more non-transitory computer-readable media according to claim 13, wherein the selecting, by the global management platform, a first available site comprises:
- selecting, by the global management platform based on a first global QoS information table, the first available site that meets the first delay requirement from among the sites managed by the global management platform, wherein the first global QOS information table comprises QoS information of the sites managed by the global management platform.

15. The one or more non-transitory computer-readable media according to claim 13, wherein the operations further comprise:
- selecting, by the global management platform, a second application instance that does not meet the second delay requirement, wherein the second application instance is selected from among the one or more first application instances;
- selecting, by the global management platform, a second available site that meets the second delay requirement, wherein the second available site is selected from among the managed sites; and
- deploying, by the global management platform, the second application instance on the second available site.

16. The one or more non-transitory computer-readable media according to claim 13, wherein the operations further comprise:
- setting, by the global management platform, a resource reservation threshold based on a quantity of connections that can be established to a third application instance deployed on a managed first site; and
- when a remaining quantity of connections to the managed first site is less than the resource reservation threshold, deploying, by the global management platform, a fourth application instance on the managed first site, wherein QoS information of the fourth application instance is the same as or equal to QoS information of the third application instance.

17. The one or more non-transitory computer-readable media according to claim 13, wherein the operations further comprise:
- receiving, by the global management platform, a first request message from a second client or a regional management platform, wherein the first request message is used to request to schedule an application instance for the second client, and the first request message comprises identification information of the second client; and
- obtaining, by the global management platform, an available application instance from the one or more first application instances through filtering based on the first request message and a second global QoS information table, wherein the second global QOS information table comprises QoS information of the one or more first application instances.

18. The one or more non-transitory computer-readable media according to claim 17, wherein the first request message further comprises a third delay requirement.

* * * * *

UNITED STATES PATENT AND TRADEMARK OFFICE
CERTIFICATE OF CORRECTION

PATENT NO.         : 12,294,523 B2
APPLICATION NO.    : 17/886017
DATED              : May 6, 2025
INVENTOR(S)        : Nannan Wang, Yang Xu and Bo Yi Page 1 of 1

It is certified that error appears in the above-identified patent and that said Letters Patent is hereby corrected as shown below:

In the Claims

In Column 27, In Line 5, In Claim 1, delete "(QOS)" and insert -- (QoS) --.

In Column 27, In Line 29, In Claim 1, delete "delay:" and insert -- delay; --.

In Column 28, In Line 17, In Claim 5, delete "QOS" and insert -- QoS --.

In Column 28, In Line 31, In Claim 7, delete "(QOS)" and insert -- (QoS) --.

In Column 28, In Line 48, In Claim 7, after "connections" insert -- ; --.

In Column 28, In Line 48-50, In Claim 7, delete "determining a first total communication delay of accessing all the application instances by the first client;" and insert the same on Column 28, Line 49, as a new sub point.

In Column 29, In Line 19 (Approx.), In Claim 10, delete "QOS" and insert -- QoS --.

In Column 29, In Line 45 (Approx.), In Claim 13, delete "(QOS)" and insert -- (QoS) --.

In Column 30, In Line 15, In Claim 14, delete "QOS" and insert -- QoS --.

In Column 30, In Line 60, In Claim 17, delete "QOS" and insert -- QoS --.

Signed and Sealed this
Twenty-third Day of September, 2025

John A. Squires
*Director of the United States Patent and Trademark Office*